US009489546B2

(12) United States Patent
Yoshida et al.

(10) Patent No.: US 9,489,546 B2
(45) Date of Patent: Nov. 8, 2016

(54) DATA INPUT DEVICE, DATA INPUT METHOD AND COMPUTER READABLE STORAGE MEDIUM

(71) Applicant: CASIO COMPUTER CO., LTD., Shibuya-ku (JP)

(72) Inventors: Satoshi Yoshida, Akiruno (JP); Kazuyoshi Haraguchi, Chofu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/858,433

(22) Filed: Sep. 18, 2015

(65) Prior Publication Data

US 2016/0171254 A1 Jun. 16, 2016

(30) Foreign Application Priority Data

Dec. 10, 2014 (JP) ................. 2014-249505

(51) Int. Cl.
*G06K 7/06* (2006.01)
*G06K 1/12* (2006.01)
*G06K 19/06* (2006.01)

(52) U.S. Cl.
CPC ......... *G06K 1/121* (2013.01); *G06K 19/06037* (2013.01)

(58) Field of Classification Search
CPC .......... G06K 7/06; G06K 7/00; G06K 19/00; G06K 19/06; G06F 17/00

USPC ................. 235/441, 375, 487, 439, 492, 435
See application file for complete search history.

(56) References Cited

U.S. PATENT DOCUMENTS

| | | | |
|---|---|---|---|
| 2002/0016717 A1* | 2/2002 | Ponzio, Jr. .......... | G06F 11/3006 705/51 |
| 2006/0095647 A1* | 5/2006 | Battaglia .......... | G06K 19/07703 711/100 |
| 2015/0066752 A1* | 3/2015 | Phillips .............. | G06Q 10/0837 705/40 |

FOREIGN PATENT DOCUMENTS

JP 9-102000 4/1997

* cited by examiner

*Primary Examiner* — Edwyn Labaze
(74) *Attorney, Agent, or Firm* — Cozen O'Connor

(57) ABSTRACT

A data input device includes a determination unit, a generation/selection unit and a storage control unit. The determination unit determines whether a predetermined automatic label generation condition is satisfied on the basis of (i) input data and (ii) predetermined data that has a type relevant to the input data and is stored in an automatic label generation condition storage unit. The generation/selection unit generates or selects electronic label information having a predetermined content fit for the automatic label generation condition when the determination unit determines that the automatic label generation condition is satisfied. The storage control unit correlates and stores the generated or selected electronic label information with input-data identification information of the input data in a label information storage unit.

12 Claims, 9 Drawing Sheets

| RECEIVED-ORDER SLIP NUMBER | CUSTOMER CODE | PRODUCT CODE | UNIT PRICE | NUMBER OF ORDER-RECEIVED ARTICLES | AMOUNT OF RECEIVED ORDER |
|---|---|---|---|---|---|

| PLACED-ORDER SLIP NUMBER | SUPPLIER CODE | PRODUCT CODE | UNIT PRICE | NUMBER OF ORDER-PLACED ARTICLES | AMOUNT OF PLACED ORDER |
|---|---|---|---|---|---|

| PRODUCT CODE | PRODUCT NAME | UNIT PRICE |
|---|---|---|

| PRODUCT CODE | NUMBER OF STOCKS |
|---|---|

| CUSTOMER CODE | CUSTOMER NAME | ADDRESS | PHONE | CREDIT LIMIT |
|---|---|---|---|---|

| CUSTOMER CODE | AMOUNT OF RECEIVED ORDER | AMOUNT OF SALES | BILLED AMOUNT |
|---|---|---|---|

| SUPPLIER CODE | SUPPLIER NAME | ADDRESS | PHONE |
|---|---|---|---|

| TARGET APPLICATION ID | LABEL ID | AUTOMATIC LABEL GENERATION CONDITION | LABEL TITLE | LABEL CONTENT |
|---|---|---|---|---|
| H110010001 | 00001 | {NUMBER OF STOCKS} < {NUMBER OF ORDER-RECEIVED ARTICLES THIS TIME} | CHECK ORDER PLACEMENT | {PRODUCT NAME} IS RUNNING SHORT. PLEASE PLACE ORDER. |
| H110010002 | 00001 | {NUMBER OF STOCKS} < {NUMBER OF ORDER-RECEIVED ARTICLES THIS TIME} | CHECK ORDER PLACEMENT | {PRODUCT NAME} IS RUNNING SHORT. PLEASE PLACE ORDER. |
| H110010002 | 00002 | {AMOUNT OF RECEIVED ORDER THIS TIME}+{ACCRUED AMOUNT} ≥ {CREDIT LIMIT} | CHECK CREDIT | ACCRUED AMOUNT OF {CUSTOMER NAME} EXCEEDS CREDIT LIMIT. PLEASE CHECK PAYMENT STATUS. |
| ⋮ | ⋮ | ⋮ | ⋮ | ⋮ |

| LABEL ID | ASSOCIATED APPLICATION ID |
|---|---|
| 00001 | H120010001 |
| 00001 | H120010002 |
| 00002 | H110010005 |
| ⋮ | ⋮ |

| LABEL No. | USER ID | LABEL TITLE | LABEL CONTENT | IN-OPERATION APPLICATION ID | IN-INPUT SLIP NUMBER | LABEL ID | LABEL INPUT DATE/TIME | ASSOCIATED LABEL No. |
|---|---|---|---|---|---|---|---|---|
| 000001 | 012473 | CHECK WITH Mr. SUZUKI | CHECK WHAT TIME ON MONDAY WE VISIT USER. | | | | 201409010903 | |
| 000002 | 012473 | CHECK ORDER PLACEMENT | PK-75 IS RUNNING SHORT. PLEASE PLACE ORDER. | H110010002 | 00321457 | 00001 | 201409021432 | |
| ... | ... | ... | ... | ... | ... | ... | ... | ... |

| LABEL No. | USER ID | LABEL TITLE | LABEL CONTENT | IN-OPERATION APPLICATION ID | IN-INPUT SLIP NUMBER | LABEL ID | LABEL INPUT DATE/TIME | ASSOCIATED LABEL No. |
|---|---|---|---|---|---|---|---|---|
| 000001 | 012473 | CHECK WITH Mr. SUZUKI | CHECK WHAT TIME ON MONDAY WE VISIT USER. | | | | 201409010903 | |
| 000002 | 012473 | CHECK ORDER PLACEMENT | PK-75 IS RUNNING SHORT. PLEASE PLACE ORDER. | H110010002 | 00321457 | 00001 | 201409021432 | 000003 |
| 000003 | 023475 | ORDER PLACED | ORDER OF PK-75 WAS PLACED. | H120010001 | 00478641 | | 201409100912 | 000002 |
| ... | ... | ... | ... | ... | ... | ... | ... | ... |

DATA INPUT DEVICE, DATA INPUT METHOD AND COMPUTER READABLE STORAGE MEDIUM

CROSS-REFERENCE TO RELATED APPLICATIONS

This application is based upon and claims the benefit of priority under 35 USC 119 of Japanese Patent Application No. 2014-249505 filed Dec. 10, 2014, the entire disclosure of which, including the description, claims, drawings and abstract, is incorporated herein by reference in its entirety.

BACKGROUND OF THE INVENTION

1. Field of the Invention

The present invention relates to a data input device, a data input method and a computer readable storage medium.

2. Description of the Related Art

There has been known a technique to attach an electronic label to a slip or the like. For example, there is described in Japanese Patent Application Publication No. H09-102000 a technique to attach an electronic label to an electronic slip by inputting the content of the electronic label from an interactive electronic label attachment screen.

However, an electronic label management system is, in general, limited to the following use; an operator inputs what he/she notices while inputting a slip or the like. Therefore, unless an operator notices, no label is generated even when an event to be conveyed with an electronic label occurs. For example, even when the stock of a product of a received order has run low and order placement thereof is needed, unless an operator notices that while inputting the received order, no electronic label such as "Stock has run low. Check order placement." is generated.

SUMMARY OF THE INVENTION

Objects of the present invention include generating or selecting an electronic label even when an operator does not notice that an event to be conveyed with an electronic label occurs.

According to a first aspect of the present invention, there is provided a data input device, including: a determination unit which determines whether a predetermined automatic label generation condition is satisfied on the basis of (i) input data and (ii) predetermined data that has a type relevant to the input data and is stored in an automatic label generation condition storage unit; a generation/selection unit which generates or selects electronic label information having a predetermined content fit for the automatic label generation condition when the determination unit determines that the automatic label generation condition is satisfied; and a storage control unit which correlates and stores the generated or selected electronic label information with input-data identification information of the input data in a label information storage unit.

According to a second aspect of the present invention, there is provided a data input method, including: determining whether a predetermined automatic label generation condition is satisfied on the basis of (i) input data and (ii) predetermined data that has a type relevant to the input data and is stored in an automatic label generation condition storage unit; generating or selecting electronic label information having a predetermined content fit for the automatic label generation condition when determining that the automatic label generation condition is satisfied; and correlating and storing the generated or selected electronic label information with input-data identification information of the input data in a label information storage unit.

According to a third aspect of the present invention, there is provided a non-transitory computer readable storage medium having a program stored therein to make a computer of a data input device: determine whether a predetermined automatic label generation condition is satisfied on the basis of (i) input data and (ii) predetermined data that has a type relevant to the input data and is stored in an automatic label generation condition storage unit; generate or select electronic label information having a predetermined content fit for the automatic label generation condition when determining that the automatic label generation condition is satisfied; and correlate and store the generated or selected electronic label information with input-data identification information of the input data in a label information storage unit.

BRIEF DESCRIPTION OF THE DRAWING

The present invention is fully understood from the detailed description given hereinafter and the accompanying drawings, which are given by way of illustration only and thus are not intended to limit the present invention, wherein.

DETAILED DESCRIPTION OF THE PREFERRED EMBODIMENT

Hereinafter, a preferred embodiment of the present invention is detailed with reference to the drawings. The present invention is not limited to the illustrated examples.

(Configuration of Data Input Device 1)

Figure 1:
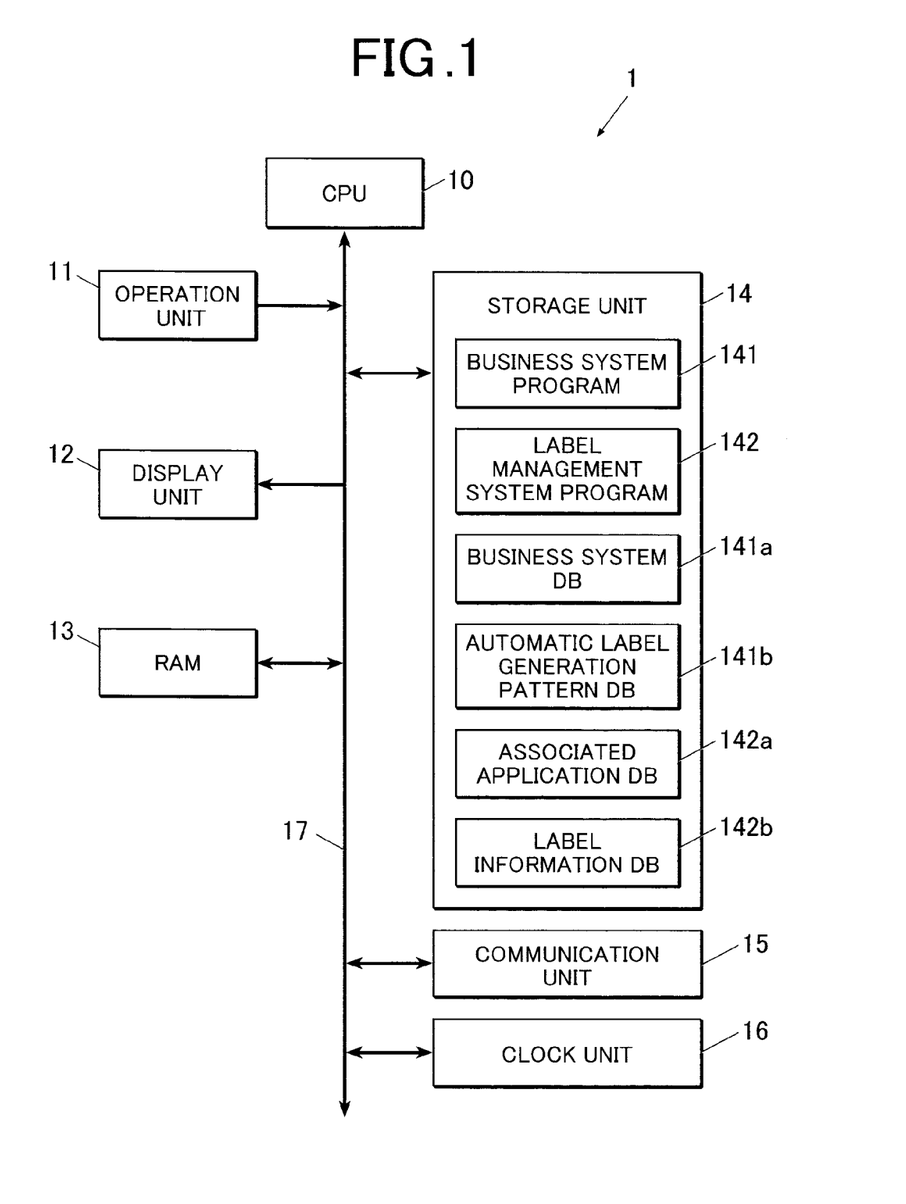
FIG. 1 is a block diagram showing the functional configuration of a data input device according to an embodiment of the present invention.

FIG. 1 is a block diagram showing the functional configuration of a data input device 1 according to an embodiment of the present invention.

As shown in FIG. 1, the data input device 1 includes a CPU (Central Processing Unit) 10, an operation unit 11, a display unit 12, a RAM (Random Access Memory) 13, a storage unit 14, a communication unit 15 and a clock unit 16, and these units are connected to one another via a bus 17.

The CPU 10 reads a system program (OS: Operating System) stored in the storage unit 14, opens the system program in a work area of the RAM 13 and controls the units in accordance with the system program. The CPU 10 also functions as a business system 101 by working together with a business system program 141 stored in the storage unit 14. The CPU 10 also functions as a label management system 102 by working together with a label management system program 142 stored in the storage unit 14.

The operation unit 11 includes a keyboard provided with cursor keys, number input keys, various function keys and the like and a pointing device such as a mouse, and outputs to the CPU 10 command signals which are input by the keys of the keyboard or the mouse being operated. The operation unit 11 may be provided with a touch panel on a display screen of the display unit 12. In this case, the operation unit 11 outputs to the CPU 10 command signals input through the touch panel.

The display unit 12 is constituted of an LCD (Liquid Crystal Display), an organic EL (Electro Luminescence) display or the like. The display unit 12 displays thereon various screens in response to display signals input from the CPU 10.

The RAM 13 has the work area where programs, input data, output data, parameters and the like read from the storage unit 14 by the CPU 10 are temporarily stored.

The storage unit 14 is constituted of a nonvolatile semiconductor memory or the like. The storage unit 14 stores therein: the system program, the business system program 141 and the label management system program 142 executed by the CPU 10; the data necessary for execution of these programs; and the like. These programs are stored in the storage unit 14 in the form of computer readable program codes. The CPU 10 acts according to the program codes.

The storage unit 14 also stores therein a business system DB (DataBase) 141a, an automatic label generation pattern DB 141b, an associated application DB 142a and a label information DB 142b.

Figure 2:
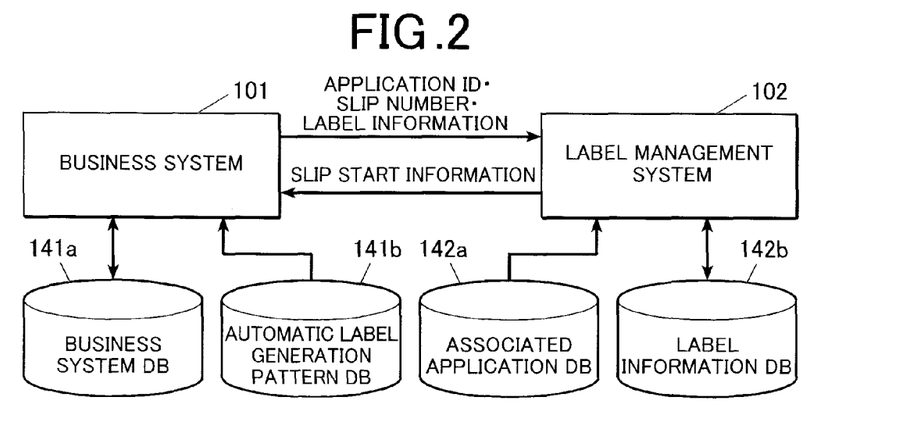
FIG. 2 shows a relationship of a business system, a label management system, a business system DB, an automatic label generation pattern DB, an associated application DB and a label information DB.

FIG. 2 shows a relationship of the business system 101, the label management system 102, the business system DB 141a, the automatic label generation pattern DB 141b, the associated application DB 142a and the label information DB 142b.

As shown in FIG. 2, the business system 101 refers to the business system DB 141a and the automatic label generation pattern DB 141b, whereas the label management system 102 refers to the associated application DB 142a and the label information DB 142b.

The business system 101 inputs transaction data by slip input so as to accumulate the transaction data in the business system DB 141a and performs sales management and the like on the basis of the information in the database. The business system program 141 includes a plurality of application programs (hereinafter referred to as "business applications").

Examples of the business applications include: a received-order application to accept input of received-order slips and update a received-order detail table 1411 (see FIG. 3A) of the business system DB 141a on the basis of the input slip information; and a placed-order application to accept input of placed-order slips and update a placed-order detail table 1412 (see FIG. 3B) of the business system DB 141a on the basis of the input slip information. Each business application is provided with an identifier called an application ID. By specifying an application ID, a specific business application is started.

The business system DB 141a is a database where basic information necessary for business is stored and also where information input through the business applications of the business system program 141, information calculated on the basis of the input information and the like are accumulated.

Figure 3A:
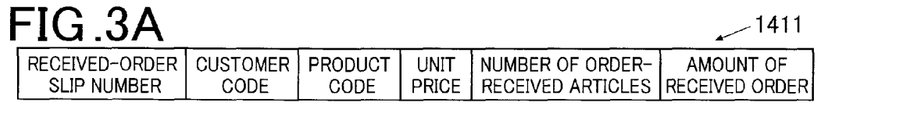
FIG. 3A to FIG. 3G show examples of tables constituting the business system DB.
Figure 3B:
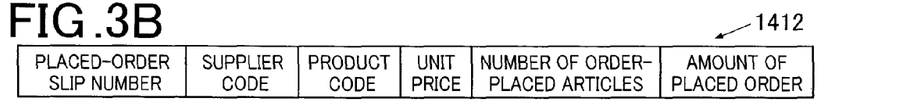
Figure 3C:
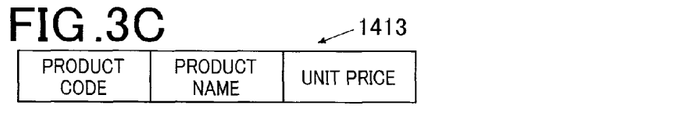
Figure 3D:
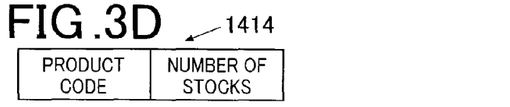
Figure 3E:
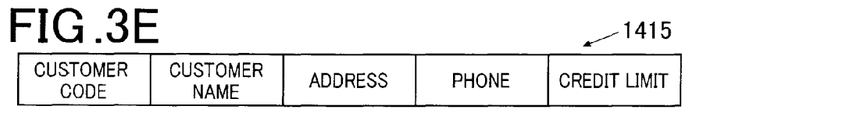
Figure 3F:
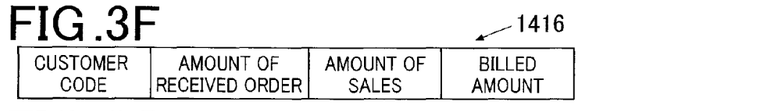
Figure 3G:
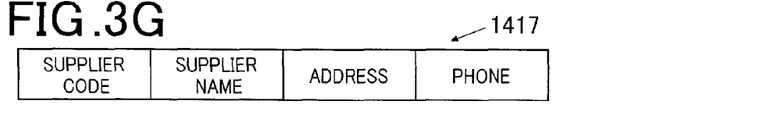

The business system DB 141a contains the received-order detail table 1411 shown in FIG. 3A, the placed-order detail table 1412 shown in FIG. 3B, a product master table 1413 shown in FIG. 3C, a stock management table 1414 shown in FIG. 3D, a customer master table 1415 shown in FIG. 3E, an accrued amount by customer table 1416 shown in FIG. 3F and a supplier master table 1417 shown in FIG. 3G.

The business system DB 141a functions as an automatic label generation condition storage unit and an input data storage unit.

The received-order detail table 1411 is a table where slip information of received-order slips input through the received-order application is stored. The placed-order detail table 1412 is a table where slip information of placed-order slips input through the placed-order application is stored.

The business system DB 141a also contains other tables where slip information input through the business applications is stored, such as a sales detail table, a warehousing management table and a shipping management table. The slip information in the tables is managed by using slip numbers which are identification information (IDs) to identify slips.

The product master table 1413 is a table where basic information on products is stored. The customer master table 1415 is a table where basic information on customers is stored. The supplier master table 1417 is a table where basic information on suppliers is stored. The stock management table 1414 is a table to which the number of stocks is added when products are warehoused and from which the number of stocks is subtracted when products are shipped. The accrued amount by customer table 1416 is a table where data for calculation of accrued amounts of respective customers are stored.

The automatic label generation pattern DB 141b is a database where automatic label generation conditions to automatically generate labels (digital labels) are correlated and stored with contents of digital label information (labels) (hereinafter referred to as "label information") automatically generated when the automatic label generation conditions are satisfied. That is, the automatic label generation pattern DB 141b functions as an automatic label generation pattern storage unit.

Figure 4:
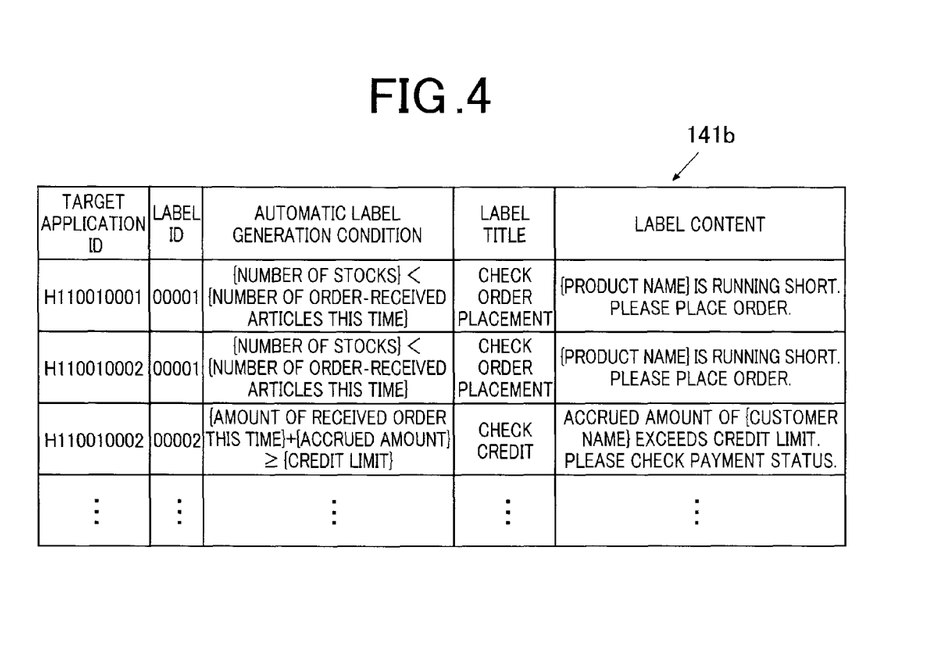
FIG. 4 shows an example of data stored in the automatic label generation pattern DB.

FIG. 4 shows an example of data stored in the automatic label generation pattern DB 141b.

As shown in FIG. 4, the automatic label generation pattern DB 141b has fields of "Target Application ID", "Label ID", "Automatic Label Generation Condition", "Label Title" and "Label Content".

The "Target Application ID" is a field of application IDs of business applications (target applications) as a target in which label information is automatically generated. In the embodiment, the business applications as the automatic label generation target are business applications to input slips, such as the received-order application and the placed-order application, but not limited thereto.

The "Label ID" is a field of label identification information (IDs) to identify the types of label information automatically generated.

The "Automatic Label Generation Condition" is a field of conditions to automatically generate label information, namely, the automatic label generation conditions.

In the embodiment, each automatic label generation condition is expressed by a relational expression of (i) data (input data) input through a business application and (ii) predetermined data having a type(s) relevant to the input data and/or data calculated on the basis of a group of predetermined data having types relevant to the input data.

The predetermined data having a type relevant to the input data is, to be specific, data of a predetermined item of a predetermined table in the business system DB 141a, the item being relevant to the input data (data of an item different from the item(s) of the input data).

Data having the same type as the input data, for example, a value to determine whether the input data is correct or not, such as a correct value of the input data, an incorrect value thereof or a threshold value therefor, is not the predetermined data having a type relevant to the input data.

The "Label Title" is a field of titles of label information generated when the automatic label generation conditions are satisfied.

The "Label Content" is a field of detailed contents of label information generated when the automatic label generation conditions are satisfied.

Each character string in "{ }" in each field in the automatic label generation pattern DB 141b represents a name of a variable in a business application, and when a target application is executed, the name is actually input or replaced by a value obtained or calculated from the business system DB 141a. For each business application, a plurality of records can be registered.

The label management system 102 accepts input of label information made by user operation and stores the input label information in the label information DB 142b, and also stores in the label information DB 142b the label information sent from the business system 101 when each automatic label generation condition is satisfied.

The label management system 102 performs display control of labels based on the label information stored in the label information DB 142b by executing the below-described display control process or the like.

The associated application DB 142a is a database where association (correlations) of (i) label information automatically generated with (ii) business applications associated with the contents of the label information is stored.

That is, the associated application DB 142a functions as an associated application storage unit. The business applications associated with the contents of the label information are each as follows; if a user looks at (reads) the label based on the label information while the application is in operation, it is useful.

Figure 5:
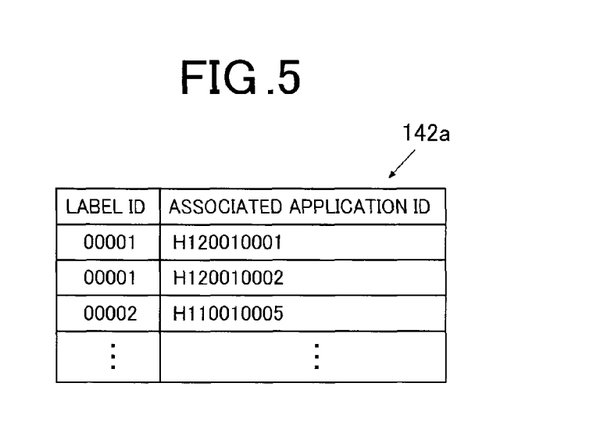
FIG. 5 shows an example of data stored in the associated application DB.

FIG. 5 shows an example of data stored in the associated application DB 142a.

As shown in FIG. 5, the associated application DB 142a has fields of "Label ID" and "Associated Application ID".

The "Label ID" is a field of label identification information (IDs) to identify the types of label information automatically generated.

The "Associated Application ID" is a field of application IDs of business applications associated with label information identified with label IDs.

Figure 6A:
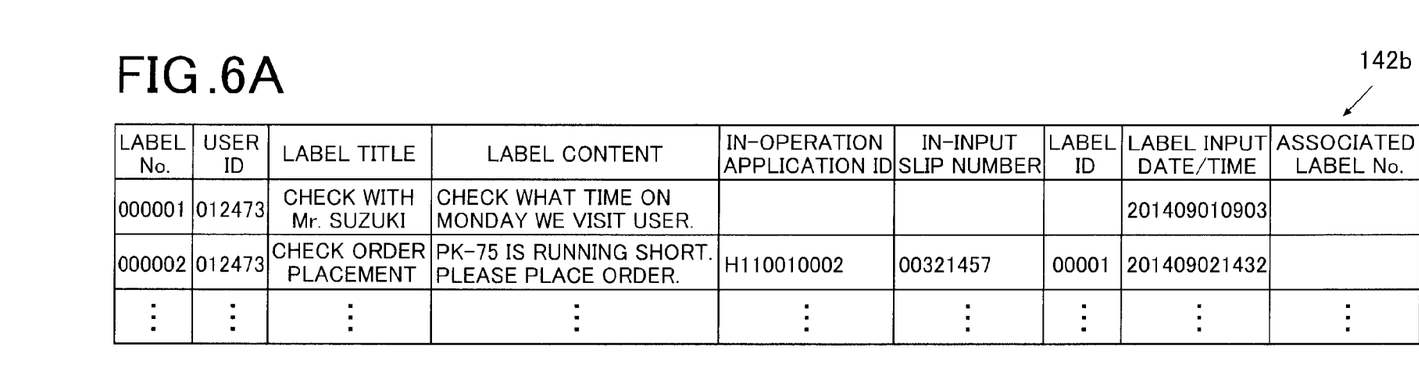
FIG. 6A and FIG. 6B show an example of data stored in the label information DB.
Figure 6B:
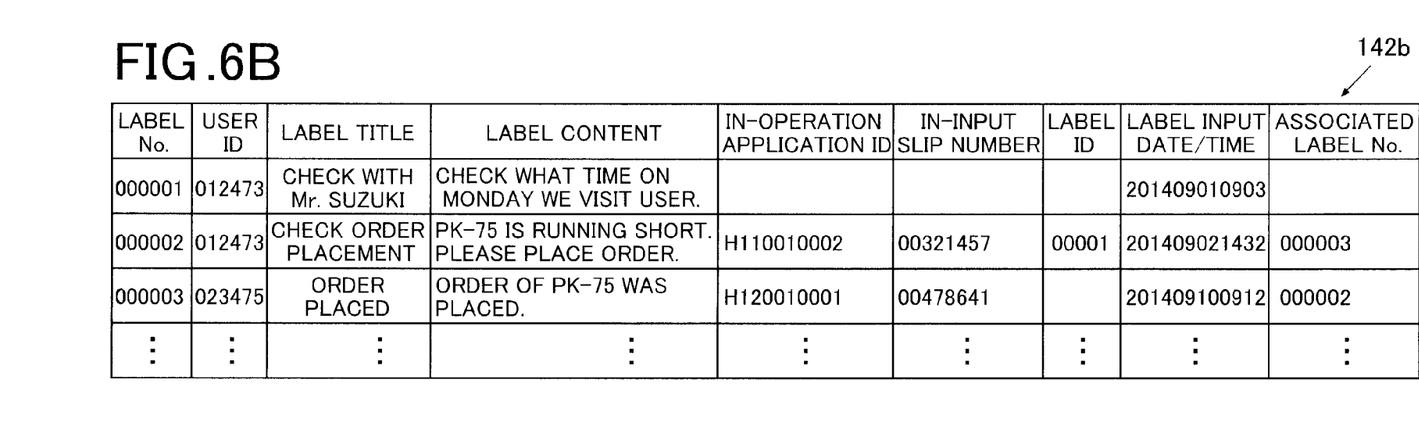

The label information DB 142b is a database where generated label information, including the automatically-generated label information, is stored.

FIG. 6A and FIG. 6B show an example of data stored in the label information DB 142b. The label information DB 142b functions as a label information storage unit.

As shown in FIG. 6A and FIG. 6B, the label information DB 142b has fields of "Label No.", "User ID", "Label Title", "Label Content", "In-operation Application ID", "In-input Slip No.", "Label ID", "Label Input Date/Time" and "Associated Label No.".

The "Label No." is a field of sequential numbers given to label information.

The "User ID" is a field of user IDs of users who input label information or users who log in when label information is automatically generated.

The "Label Title" is a field of titles of label information.

The "Label Content" is a field of detailed contents of label information.

The "In-operation Application ID" is a field of application IDs of business applications having been started, thereby operating (in operation), when label information is automatically generated. This field of each record about not-automatically-generated label information is blank.

The "In-input Slip No." is a field of slip numbers to identify slip information (slips) being input (in input) when label information is automatically generated. This field of each record about not-automatically-generated label information is blank.

The "Label ID" is a field of label identification information (IDs) to identify the types of label information. This field of each record about not-automatically-generated label information is blank.

The "Label Input Date/Time" is a field of dates and time at which label information is generated.

The "Associated Label No." is a field of label numbers of associated label information (associated labels). When no associated label exists, this field is blank.

The storage unit 14 also stores therein the display order of label buttons 122a (see FIG. 7) set through the operation unit 11 or the communication unit 15. More specifically, the storage unit 14 stores therein the display order of label buttons 122a used when the label buttons 122a are not displayed by group and the display order of label buttons 122a of each group used when the label buttons 122a are displayed by group in the below-described display control process.

The storage unit 14 also stores therein a user table where user information (user IDs, passwords, user names and the like) on users who can login to the business system 101 and the label management system 102 and application IDs of their accessible business applications are stored.

The communication unit 15 includes a modem, a router and a network card. The communication unit 15 sends/receives data to/from an external device connected thereto through a communication network.

The clock unit 16 has a built-in clock circuit such as an RTC (Real Time Clock), and measures and outputs the current date and time to the CPU 10.

(Action of Data Input Device 1)

Next, action of the data input device 1 is explained.

When the data input device 1 is powered, the CPU 10 displays a log-in screen on the display unit 12 by working together with the system program (OS). When a user ID and a password are input from the log-screen through the operation unit 11, the CPU 10 determines on the basis of the input user ID and password and the information stored in the user table in the storage unit 14 whether or not the user is permitted to log in to the business system 101 and the label management system 102.

When determining that the user is permitted to log in, the CPU 10 stores the user ID of the logged-in user in the RAM 13.

Figure 7:
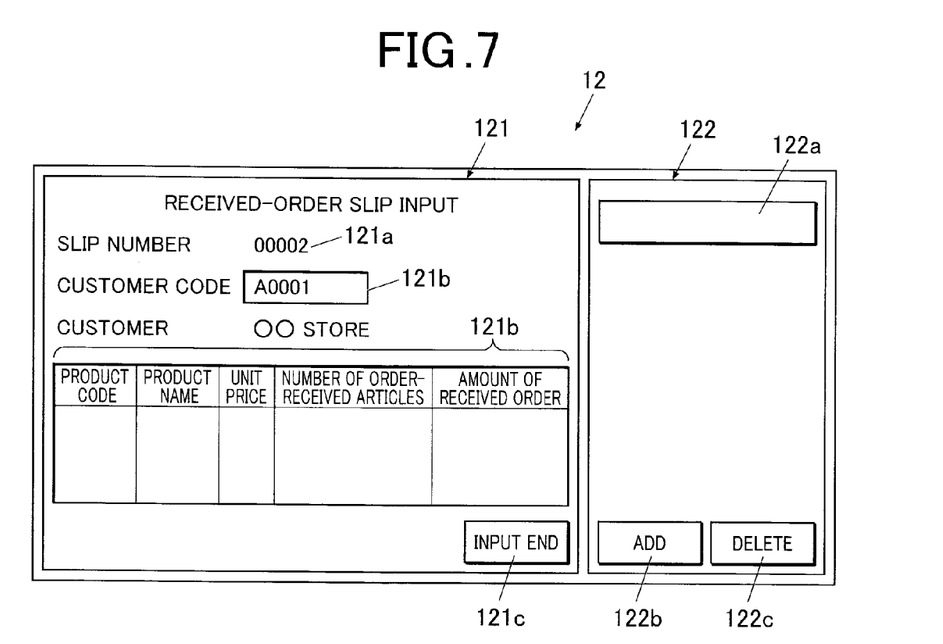
FIG. 7 shows an example of a display unit in a state in which the business system and the label management system are in operation.

In addition, the CPU 10 loads the business system program 141 and the label management system program 142 to the RAM 13 so as to start the business system 101 and the label management system 102, and displays a business system region 121 and a label management system region 122 shown in FIG. 7 on the display unit 12.

After being started, the business system 101 shown in FIG. 2 displays a menu screen (not shown) in the business system region 121.

On the menu screen, only menus for business applications which the logged-in user is permitted to access are displayed.

When a menu is selected on the menu screen through the operation unit 11, the business system 101 starts a business application corresponding to the selected menu, notifies the label management system 102 about the application ID of the started business application and performs the below-described automatic label generation monitoring process. When the business application ends, the business system 101 notifies the label management system 102 that the business application ends.

The business system 101 functions as a determination unit and a generation/selection unit.

After being started, the label management system 102 displays the label button(s) 122a, an addition ("Add") button 122b and a deletion ("Delete") button 122c in the label management system region 122 as shown in FIG. 7.

The label buttons 122a correspond to respective label information (respective records) stored in the label information DB 142b. Each label button 122a is a label showing, for example, a label title, a date and time, a handling person's name and/or the first several words of a label content.

The label management system 102 displays the label buttons 122a on the basis of the "Label Title", "Label Input Date/Time", "User ID" and "Label Content" of their respective records. The label buttons 122a are displayed in the preset display order of the label buttons 122a stored in the storage unit 14. However, when the business system 101 starts a business application and notifies the label management system 102 about the application ID of the started business application, the label management system 102 performs the below-described display control process and rearranges the display order of the label buttons 122a.

The addition button 122b is a button to input a command to generate additional label information. When the addition button 122b is pressed through the operation unit 11, the label management system 102 displays a label information input screen (not shown) on the display unit 12 as a pop-up or the like, generates label information constituted of items (fields) shown in FIG. 6A or FIG. 6B on the basis of contents input from this screen, and stores the generated label information in the label information DB 142b.

The label based on the generated label information is displayed in the label management system region 122.

The deletion button 122c is a button to input a command to delete a record of label information corresponding to a selected label button 122a. When a label button 122a is pressed through the operation unit 11, thereby being in a selected state, and the deletion button 122c is pressed in this state, the label management system 102 deletes the record of the label information corresponding to the selected label button 122a from the label information DB 142b.

When specifying operation (in the embodiment, double-clicking) is performed on a label button 122a through the operation unit 11 which functions as a specifying unit, the label management system 102 displays on the display unit 12 a label detail check screen 1221 (see FIG. 8) which shows the detailed content of the label corresponding to the specified label button 122a as a pop-up or the like.

Figure 8:
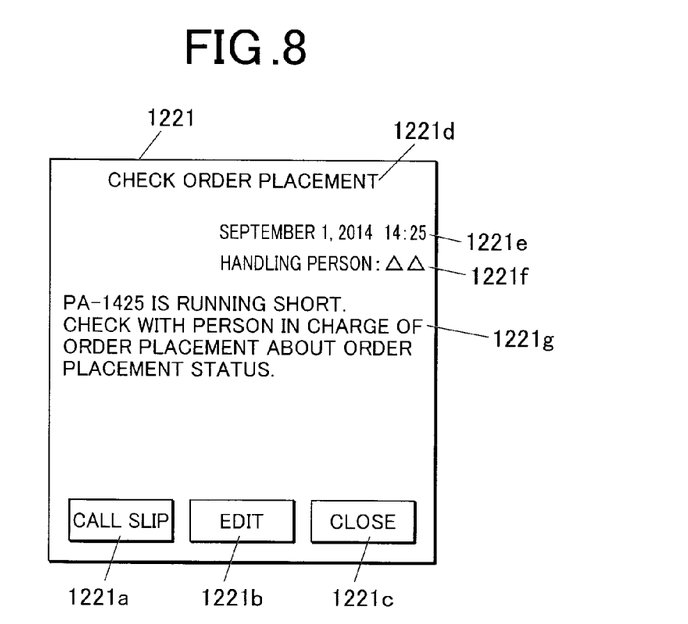
FIG. 8 shows an example of a label detail check screen displayed when a label button is specified.

FIG. 8 shows an example of the label detail check screen 1221 displayed when a label button 122a is double-clicked.

As shown in FIG. 8, on the label detail check screen 1221, a slip call ("Call Slip") button 1221a, an editing ("Edit") button 1221b, a closure ("Close") button 1221c, a label title 1221d, a label input date/time 1221e, a handling person (name) 1221f and a label content (entire text) 1221g are displayed, for example.

The slip call button 1221a is a commanding unit to make a command to display in the business system region 121 slip information in input by the business system 101 at the time of generation of the detail-displayed label.

When the slip call button 1221a is pressed, the label management system 102 refers to the record of the detail-displayed label in the label information DB 142b, and when values are stored in the "In-operation Application ID" and "In-input Slip No." of the record, sends the in-operation application ID and the in-input slip number (i.e., the values) to the business system 101 so as to request the business system 101 to display the slip having that in-input slip number.

When receiving the in-operation application ID and the in-input slip number, the business system 101 starts the business application having the received in-operation application ID, and reads the slip information having the received in-input slip number from the business system. DB 141a and displays the read slip information in the business system region 121.

The editing button 1221b is a button to edit the contents displayed on the label detail check screen 1221. When the editing button 1221b is pressed through the operation unit 11, the label management system 102 makes it possible to edit the label title 1221d and the label content 1221g displayed on the label detail check screen 1221 and also displays an enter button and a return button (both not shown).

When the enter button is pressed through the operation unit 11 after the editing, the label management system 102 updates the contents of the corresponding record in the label information DB 142b on the basis of the input contents.

The closure button 1221c is a button to close the label detail check screen 1221. When the closure button 1221c is pressed through the operation unit 11, the label management system 102 closes the label detail check screen 1221.

That is, the label management system 102 functions as a storage control unit and a display control unit.

Hereinafter, the automatic label generation monitoring process and the display control process are explained. The automatic label generation monitoring process and the display control process are performed by the business system 101 and the label management system 102, respectively, when a business application is started. First, the automatic label generation monitoring process is explained.

(Automatic Label Generation Monitoring Process)

Figure 9:
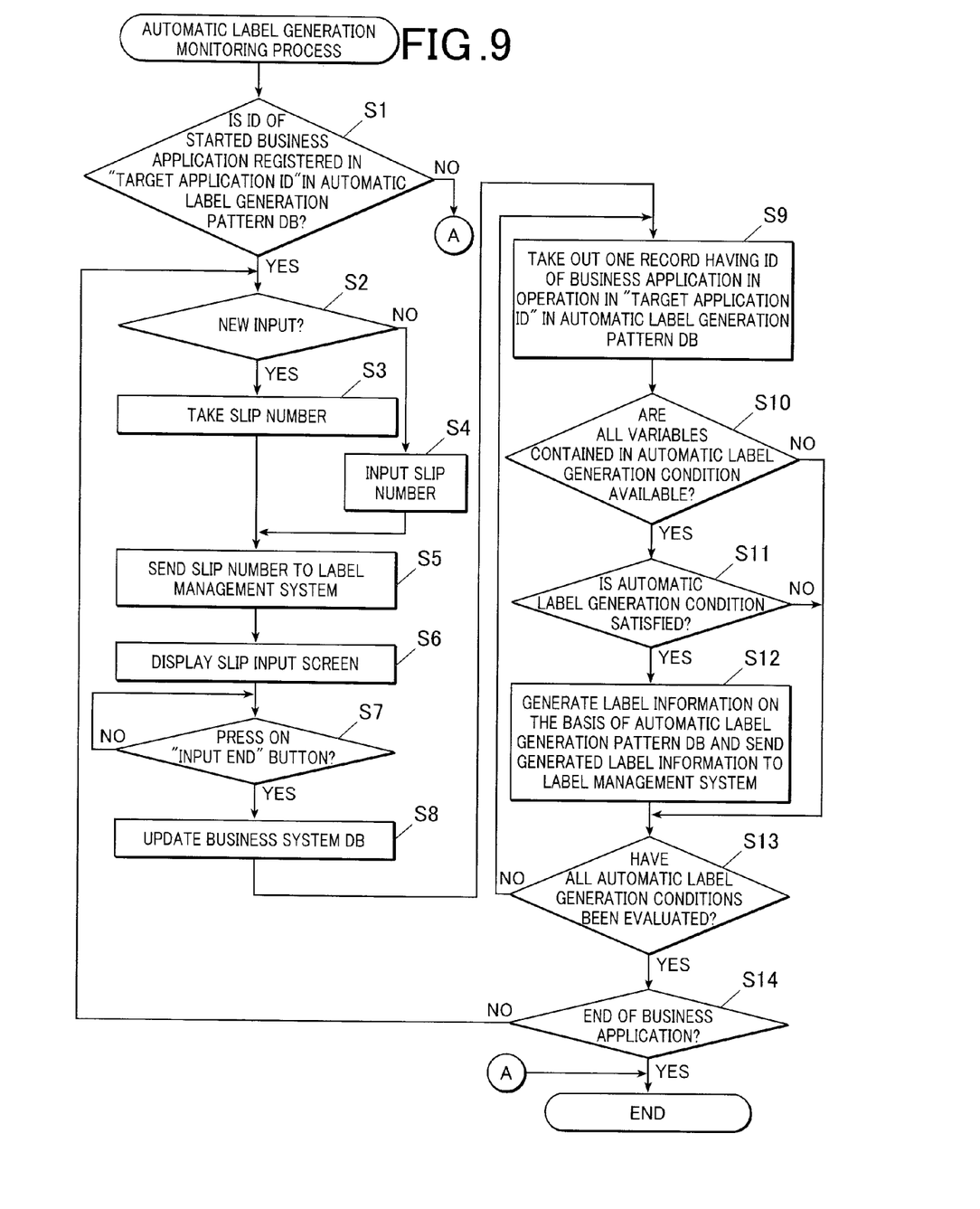
FIG. 9 is a flowchart of an automatic label generation monitoring process performed by a CPU shown in FIG. 1.

FIG. 9 is a flowchart of the automatic label generation monitoring process. The automatic label generation monitoring process is performed when the business system 101 starts any one of the business applications.

First, the business system 101 determines whether or not the application ID of the started business application is registered in the "Target Application ID" in the automatic label generation pattern DB 141b (Step S1).

When determining that the application ID of the started business application is not registered in the "Target Application ID" in the automatic label generation pattern DB 141*b* (Step S1; NO), the business system 101 ends the automatic label generation monitoring process.

On the other hand, when determining that the application ID of the started business application is registered in the "Target Application ID" in the automatic label generation pattern DB 141*b* (Step S1; YES), the business system 101 displays the menu screen to select one of "new input" and "update" on the display unit 12 (Step S2).

When the "new input" is selected through the operation unit 11 (Step S2; YES), the business system 101 takes a slip number to identify slip information (Step S3) and sends the taken slip number to the label management system 102 (Step S5).

Then, the business system 101 displays a slip input screen in the business system region 121 on the display unit 12 (Step S6) and moves to Step S7.

On the other hand, when the "update" is selected through the operation unit 11 (Step S2; NO), the business system 101 displays an input box to input a slip number on the display unit 12 so as to accept input of a slip number through the operation unit 11 (Step S4) and sends the input slip number to the label management system 102 (Step S5)

Then, the business system 101 reads the slip information having the input slip number from the business system DB 141*a* and displays the slip input screen reflecting the read slip information in the business system region 121 on the display unit 12 (Step S6) and moves to Step S7.

FIG. 7 shows, as an example of the slip input screen, a received-order slip input screen displayed in the business system region 121 when the received-order application is started.

As shown in FIG. 7, on each slip input screen, a slip number 121*a*, an input box 121*b* for an item which a user needs to input, and an end input ("Input End") button 121*c* to input a command to inform at the end of the input that the input has finished are displayed.

At Step S7, the business system 101 waits for the end input button 121*c* to be pressed (Step S7).

When the end input button 121*c* is pressed, (Step S7; YES), the business system 101 updates the business system DB 141*a* on the basis of the contents input from the slip input screen (Step S8).

For example, when data of slip information is input from the received-order slip input screen, a record is added to the received-order detail table 1411 and the input slip information is stored therein, whereby the business system DB 141*a* (received-order detail table 1411) is updated. In addition, the amount of received order this time is added to the "Amount of Received Order" in the accrued amount by customer table 1416, whereby the business system DB 141*a* (accrued amount by customer table 1416) is updated.

Next, the business system 101 refers to the automatic label generation pattern DB 141*b* and takes out one record having the application ID of the business application in operation (i.e., the started business application or the business application in operation at the time of input of the slip information) in the "Target Application ID" (Step S9) and determines whether or not all the variables contained in the automatic label generation condition of the record are available (Step S10).

For example, in the case where the received-order application having H110010002 as the application ID is in operation, and a record taken out from the automatic label generation pattern DB 141*b* is the second record in FIG. 4, the business system 101 searches (i) the "Number of Order-received Articles" of the latest record in the received-order detail table 1411, the "Number of Order-received Articles" of the record corresponding to the variable of {Number of Order-received Articles This Time} of the second record in FIG. 4, and (ii) the "Number of Stocks" of the record in the stock management table 1414 having the same product code (in the "Product Code") as the latest record in the received-order detail table 1411, the "Number of Stocks" of the record corresponding to the variable of {Number of Stocks} of the second record in FIG. 4, and determines whether or not data are stored in both of them.

When data are stored in both of them, the business system 101 determines that all the variables contained in the automatic label generation condition of the record are available.

Further, for example, in the case where the received-order application having H110010002 as the application ID is in operation, and a record taken out from the automatic label generation pattern DB 141*b* is the third record in FIG. 4, the business system 101 searches (i) the "Number of Order-received Articles" of the latest record in the received-order detail table 1411, the "Number of Order-received Articles" of the record corresponding to the variable of {Number of Order-received Articles This Time} of the third record in FIG. 4, (ii) the "Amount of Received Order", "Amount of Sales" and "Billed Amount" of the record in the accrued amount by customer table 1416 having the same customer code (in the "Customer Code") as the latest record in the received-order detail table 1411, the data stored therein being required to calculate the variable of {Accrued Amount} of the third record in FIG. 4, and (iii) the "Credit Limit" of the record in the customer master table 1415 having the same customer code (in the "Customer Code") as the latest record in the received-order detail table 1411, the "Credit Limit" of the record corresponding to the variable of {Credit Limit} the third record in FIG. 4, and determines whether or not data are stored in all of them.

When data are stored in all of them, the business system 101 determines that all the variables contained in the automatic label generation condition of the record are available.

The variable of {Accrued Amount} of a customer becomes available by calculating the sum of the values stored in the "Amount of Received Order", "Amount of Sales" and "Billed Amount".

When determining that all the variables contained in the automatic label generation condition of the record are available (Step S10; YES), the business system 101 determines whether or not the automatic label generation condition is satisfied (Step S11). That is, the business system 101 obtains or calculates each variable contained in the automatic label generation condition from the business system DB 141*a* or on the basis of the data obtained from the business system DB 141*a*, and determines whether or not the automatic label generation condition is satisfied.

When determining that the automatic label generation condition is satisfied (Step S11; YES), the business system 101 generates and sends label information to the label management system 102 (Step S12) and moves to Step S13.

The label information is data of the "Label ID", "Label Title" and "Label Content" of a record taken out from the automatic label generation pattern DB 141*b*, and when a variable(s) are contained in the label title and/or the label content, the label information is data of the "Label ID", "Label Title" and "Label Content" of a record with a value(s) assigned to the variable(s). If no value can be assigned to a variable, a null character is assigned thereto.

For example, in the case where the received-order application having H110010002 as the application ID is in operation, and a record taken out from the automatic label generation pattern DB 141b is the second record in FIG. 4, the business system 101 sends to the label management system 102 (i) data of the "Label ID" and "Label Title" of the record and (ii) data of the "Label Content" of the record with a value assigned to the variable of {Product Name} therein, the value being stored in the "Product Name" of the record in the product master table 1413 having the same product code (in the "Product Code") as the latest record in the received-order detail table 1411.

At Step S12 above, the label information is generated, but not limited thereto. The label information fit for the satisfied automatic label generation condition may be selected from a variety of label information stored in a storage unit, and sent to the label management system 102.

For example, each label information to be selected when an automatic label generation condition is satisfied may be correlated and stored with a target application ID, a label ID and the automatic label generation condition in the automatic label generation pattern DB 141b, so that when an automatic label generation condition is satisfied, the label information correlated with the satisfied automatic label generation condition can be selected from the variety of label information stored in the automatic label generation pattern DB 141b and sent (together with the label ID) to the label management system 102.

On the other hand, when determining that not all the variables contained in the automatic label generation condition of the record are available (Step S10; NO), or when determining that the automatic label generation condition is not satisfied (Step S11; NO), the business system 101 moves to Step S13.

The business system 101 determines whether or not the automatic label generation conditions of all the records in the automatic label generation pattern DB 141b having the application ID of the business application in operation in the "Target Application ID" have been evaluated about being satisfied or not (Step S13). When determining that the automatic label generation conditions of all the records have not been evaluated yet (Step S13; NO), the business system 101 returns to Step S9 so as to evaluate the automatic label generation condition of the next record. On the other hand, when determining that the automatic label generation conditions of all the records have been evaluated (Step S13; YES), the business system 101 moves to Step S14.

The business system 101 determines whether or not a command to end the business application is made through the operation unit 11 (Step S14). When determining that the command to end the business application is not made (Step S14; NO), the business system 101 returns to Step S2. On the other hand, when determining that the command to end the business application is made (Step S14; YES), the business system 101 ends the automatic label generation monitoring process.

When the label management system 102 receives the label information from the business system 101, the label management system 102 adds a record to the label information DB 142b and stores data in each item (field) of the added record on the basis of the label information received from the business system 101.

More specifically, the label management system 102 takes a sequential label number and stores the label number in the "Label No." and stores the user ID of the logged-in user in the "User ID".

The label management system 102 also stores the label title, the label content and the label ID of the label information received from the business system. 101 in the "Label Title", "Label Content" and "Label ID", respectively.

The label management system 102 also stores the application ID of the business application in operation notified by the business system 101 and the slip number of the slip in input received from the business system 101 in the "In-operation Application ID" and "In-input Slip No.", respectively.

The label management system 102 also stores the current date and time in the "Label Input Date/Time" by obtaining the current date and time from the clock unit 16.

(Display Control Process)

Next, the display control process performed by the label management system 102 is explained.

Figure 10:
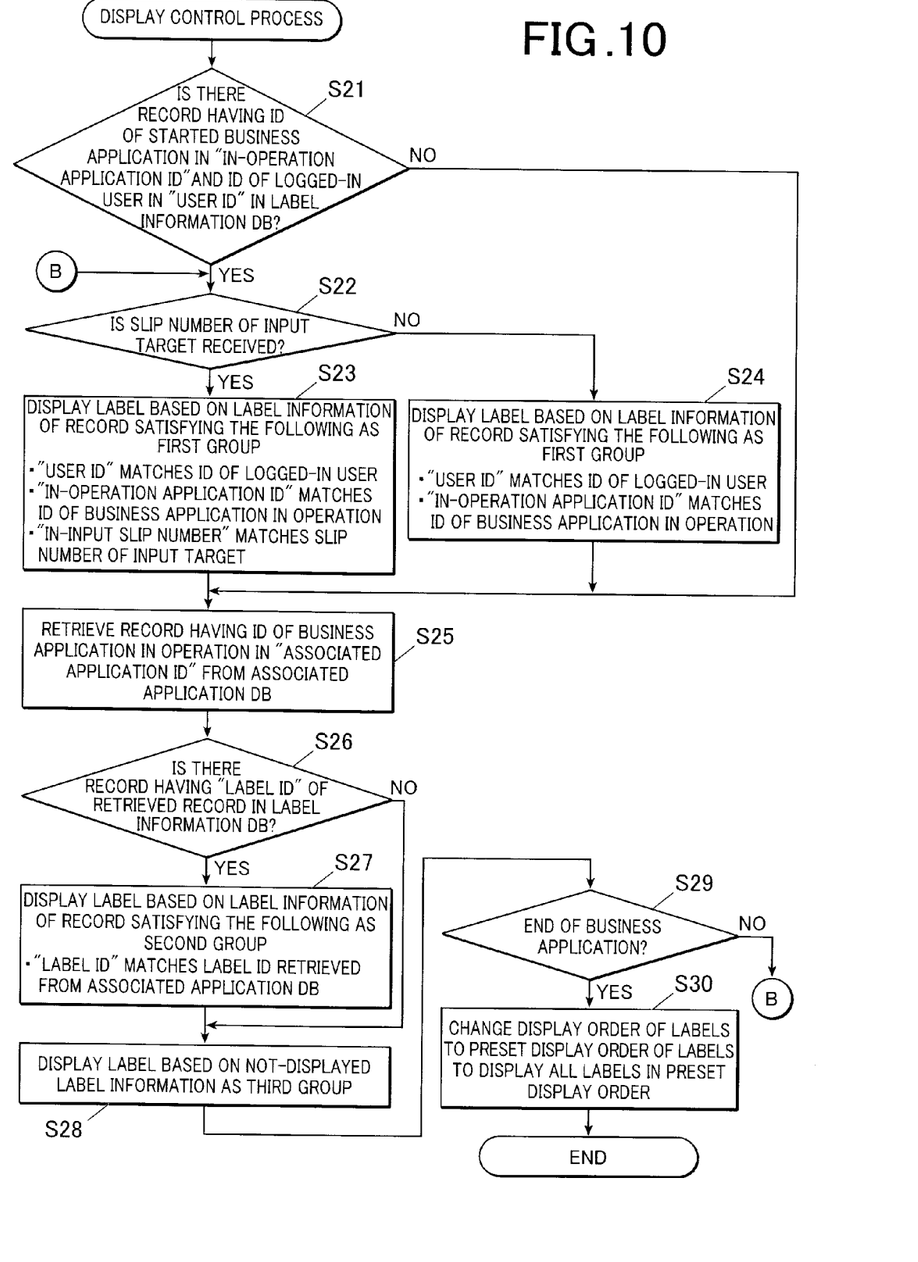
FIG. 10 is a flowchart of a display control process performed by the CPU shown in FIG. 1.

FIG. 10 is a flowchart of the display control process. The display control process is performed when the label management system 102 is notified about the application ID of the business application having been started, thereby being in operation, by the business system 101.

First, the label management system 102 refers to the label information DB 142b and determines whether or not a record(s) having the application ID of the started business application (i.e., the business application in operation) in the "In-operation Application ID" and having the user ID of the logged-in user in the "User ID" exists in the label information DB 142b (Step S21).

When determining that no record(s) having the application ID of the started business application (i.e., the business application in operation) in the "In-operation Application ID" and having the user ID of the logged-in user in the "User ID" exists in the label information DB 142b (Step S21; NO), the label management system 102 moves to Step S25.

On the other hand, when determining that a record(s) having the application ID of the started business application (i.e., the business application in operation) in the "In-operation Application ID" and having the user ID of the logged-in user in the "User ID" exists in the label information DB 142b (Step S21; YES), the label management system 102 determines whether or not the slip number of a slip as the current input target (i.e., the in-input slip number) is received from the business system 101 (Step S22).

When determining that the slip number of a slip as the current input target is received from the business system 101 (Step S22; YES), the label management system 102 retrieves, of the labels (records) stored in the label information DB 142b, a record(s) having the user ID of the logged-in user in the "User ID", having the application ID of the business application in operation in the "In-operation Application ID" and having the slip number of a slip as the current input target in the "In-input Slip No." and displays a label button(s) 122a based on the label information of the respective retrieved record(s) in the label management system region 122 on the display unit 12 as the first group (Step S23) and moves to Step S25.

That is, the label(s) generated or selected while the logged-in user is or was handling a slip which is the current input target are displayed with top priority.

In the display control process, the label buttons 122a based on the respective label information stored in the label information DB 142b are displayed by being classified as the first group, the second group and the third group. The priority order of the groups in displaying is "first group>second group>third group". The higher the priority of the group is, the higher (closer to the top) in the label management system region 122 the group is displayed.

When any of the groups has a plurality of labels (label buttons 122a), the labels of the group are displayed in the preset display order for the group stored in the storage unit 14.

When determining that the slip number of a slip as the current input target is not received from the business system 101 (Step S22; NO), the label management system 102 retrieves, of the labels (records) stored in the label information DB 142b, a record(s) having the user ID of the logged-in user in the "User ID" and having the application ID of the business application in operation in the "In-operation Application ID" and displays a label button(s) 122a based on the label information of the respective retrieved record(s) in the label management system region 122 on the display unit 12 as the first group (Step S24) and moves to Step S25.

That is, the labels generated or selected while the started business application is or was in operation and the logged-in user logs in or logged in are displayed with top priority.

At Step S25, the label management system 102 retrieves, from the associated application DB 142a, a record(s) having the application ID of the business application in operation in the "Associated Application ID" (Step S25).

Next, the label management system 102 searches the label information DB 142b and determines whether or not a record(s) having the label ID of the record retrieved at Step S25 exists therein (Step S26).

When determining that no record(s) having the label ID of the record retrieved at Step S25 exists in the label information DB 142b (Step S26; NO), the label management system 102 moves to Step S28.

On the other hand, when determining that a record(s) having the label ID of the record retrieved at Step S25 exists in the label information DB 142b (Step S26; YES), the label management system 102 retrieves the record(s) having the label ID of the record retrieved at Step S25 from the label information DB 142b and displays a label button(s) 122a based on the label information of the respective retrieved record(s) in the label management system region 122 on the display unit 12 as the second group (Step S27) and moves to Step S28.

However, in the case where no label button 122a is displayed as the first group, the label button(s) 122a based on the label information of the respective record(s) retrieved at Step S27 are displayed as the first group. The label button(s) 122a already displayed as the first group are not displayed as the second group to avoid duplication.

Each label (label button 122a) displayed at Step S27 is a label associated with the business application in operation.

For example, the label content of the record having 00001 as the label ID in FIG. 4 is "{Product Name} is running short. Please place order.". This label is useful if displayed while a person in charge of order placement is inputting a placed-order slip through the placed-order application. Then, the person in charge of order placement can recognize the stock shortage, and hence the stock shortage can be solved.

In the embodiment, in the associated application DB 142a, each label ID is correlated and stored with the application ID of a business application which is associated with a label having the type indicated by the label ID. At Step S27, a label(s) associated with the business application in operation are displayed on the basis of the information in the associated application DB 142a.

At Step S28, the label management system 102 displays a label button(s) 122a based on the label information of a record(s), among the records in the label information DB 142b, not displayed as either the first group or the second group, as the third group (Step S28).

Next, the label management system 102 determines whether or not the business application is ended (Step S29). More specifically, the label management system 102 determines whether or not the business application is ended on the basis of whether or not the end of the business application is notified by the business system 101. When determining that the business application is not ended (Step S29; NO), the label management system 102 returns to Step S22.

On the other hand, when determining that the business application is ended (Step S29; YES), the label management system 102 changes the display order of the label buttons 122a to the preset display order, which is preset by the user and stored in the storage unit 14, so as to display all the label buttons 122a in the display order preset by the user (Step S30) and then ends the display control process.

Figure 11:
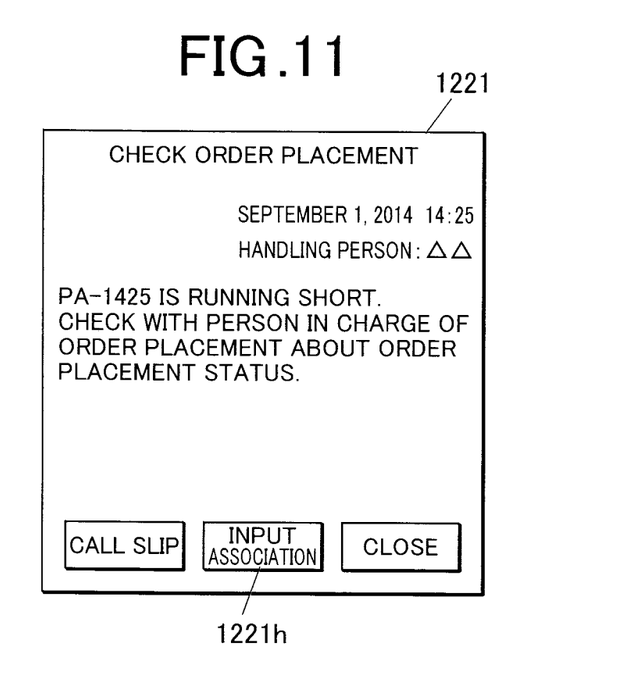
FIG. 11 shows an example of the label detail check screen displayed by the label management system when a label button displayed at Step S27 in FIG. 10 is specified.

FIG. 11 shows an example of the label detail check screen 1221 displayed by the label management system 102 when a label button 122a displayed at Step 27 is specified (double-clicked).

As shown in FIG. 11, on the label detail check screen 1221 displayed at Step S27, an association input ("Input Association") button 1221h is displayed, instead of the editing button 1221b displayed on the label detail check screen 1221 shown in FIG. 8.

When the association input button 1221h is pressed through the operation unit 11, the label management system 102 starts and displays a reply input screen (not shown) to input comments to reply to the label (called the "main label") displayed on the label detail check screen 1221.

When comments are input from the reply input screen through the operation unit 11 which functions as an input unit, the label management system 102 stores the comments input from the reply input screen in the label information DB 142b as label information of a label associated with the main label as shown in FIG. 6B. This label of the comments to reply to the main label is called the "associated label".

More specifically, the label management system 102 adds a record to the label information DB 142b, takes a sequential label number and stores the label number in the "Label No." and also stores in the "User ID" the user ID of the logged-in user at the time of press of the association input button 1221h.

The label management system 102 also stores the label title and the label content input from the reply input screen in the "Label Title" and "Label Content", respectively.

The label management system 102 also stores the application ID of the business application in operation and the slip number of the slip in input at the time of press of the association input button 1221h in the "In-operation Application ID" and "In-input Slip No.", respectively.

The label management system 102 also stores the current date and time in the "Label Input Date/Time" by obtaining the current date and time from the clock unit 16. The "Label ID" is left blank. The label management system 102 also stores, in order to show the association of the main label with the associated label, the label number of the main label being looked at at the time of press of the association input button 1221h in the "Associated Label No.". The label management system 102 stores the label number of the associated label in the "Associated Label No." of the record of the main label.

Figure 12A:
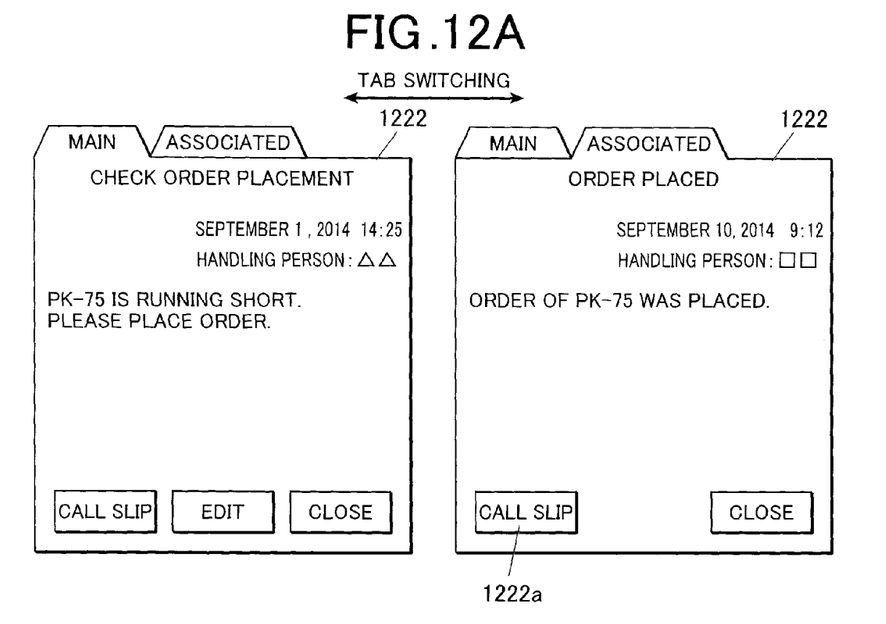
FIG. 12A and FIG. 12B show examples of the label detail check screen on which a main label and an associated label are displayed to be switchable according to user operation.

When label detail display of a main label having a label number in the "Associated Label No." in the label information DB 142b is commanded, the label management system 102 displays the label detail check screen 1222 as shown in FIG. 12A.

On the label detail check screen 1222, the main label and the associated label are displayed to be switchable according to user operation.

That is, the label management system 102 first displays the label title and the detailed content of the main label on the label detail check screen 1222, and then displays the label title and the detailed content of the associated label on the label detail check screen 1222 in response to tab switching.

Figure 12B:
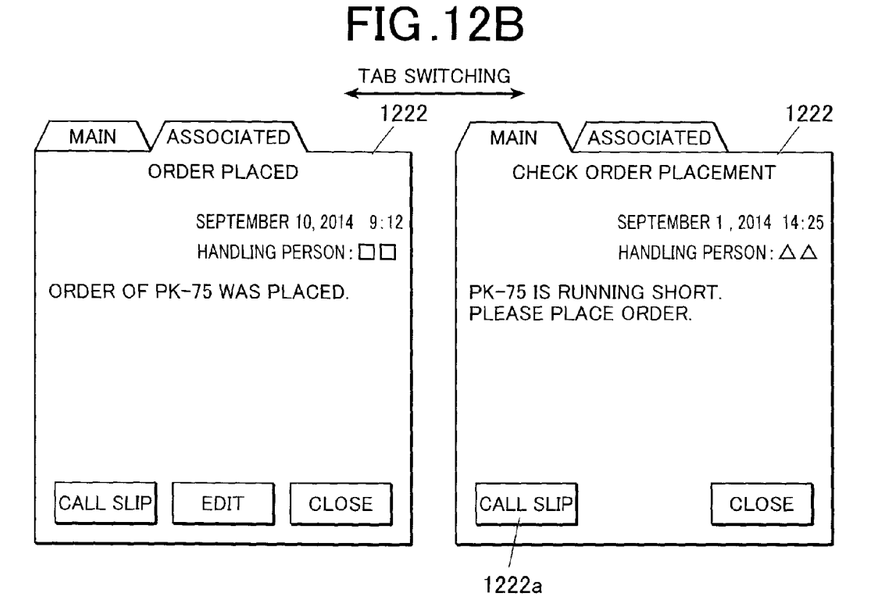

When label detail display of an associated label having a label number in the "Associated Label No." in the label information DB 142*b* is commanded, as shown in FIG. 12B, the label management system 102 first displays the label title and the detailed content of the associated label on the label detail check screen 1222, and then displays the label title and the detailed content of the main label on the label detail check screen 1222 in response to tab switching.

In the case of the label detail display of an associated label too, as shown in FIG. 12A and FIG. 12B, the label detail check screen 1222 is provided with the slip call button 1222*a*. Hence, the slip in input at the time of generation of the associated label can be displayed.

That is, when the slip call button 1222*a* is pressed on the label detail check screen 1222 on which details of an associated label are displayed, the label management system 102 refers to, in the label information DB 142*b*, the record of the associated label, the details of which are displayed on the label detail check screen 1222, and when values are stored in the "In-operation Application ID" and "In-input Slip No.", sends the in-operation application ID and the in-input slip number (i.e., the values) to the business system 101 so as to request the business system. 101 to display the slip having that in-input slip number.

When receiving the in-operation application ID and the in-input slip number, the business system 101 starts the business application having the in-operation application ID, reads the slip information having the in-input slip number from the business system DB 141*a* and displays the read slip information in the business system region 121.

As described above, according to the data input device 1, the business system 101 determines whether or not a predetermined automatic label generation condition is satisfied on the basis of (i) data of input slip information and (ii) predetermined data that has a type relevant to the data of the input slip information and is stored in the business system DB 141*a*.

When determining that the automatic label generation condition is satisfied, the business system 101 stores the data of the input slip information in the business system DB 141*a*, and also generates or selects label information having a predetermined content fit for the automatic label generation condition and sends the label information to the label management system 102. The label management system 102 correlates and stores the received label information with the slip number of the input slip information in the label information DB 142*b*.

Therefore, even when an operator does not notice that an event to be conveyed with an electronic label occurs, an electronic label can be generated or selected.

For example, in the automatic label generation pattern DB 141*b*, the automatic label generation condition is correlated and stored with the label information generated or selected when the automatic label generation condition is satisfied, and the business system 101 determines whether or not the automatic label generation condition stored in the automatic label generation pattern DB 141*b* is satisfied on the basis of the data of the input slip information and the predetermined data, and when determining that the automatic label generation condition is satisfied, generates or selects the label information having the content correlated and stored with the automatic label generation condition.

Therefore, determining whether or not an automatic label generation condition is satisfied and generating or selecting label information can be performed at high speed by using the automatic label generation pattern DB 141*b*.

Further, in the automatic label generation pattern DB 141*b*, the automatic label generation condition is correlated and stored with (i) the label information generated or selected when the automatic label generation condition is satisfied, (ii) the label identification information to identify the type of the label information and (iii) the application ID of a business application as a target in which the label information is generated, and when the application ID of a business application in operation at the time of input of the data of the slip information is stored in the automatic label generation pattern DB 141*b*, the business system 101 determines whether or not the automatic label generation condition correlated and stored with the application ID of the business application in operation is satisfied on the basis of the data of the input slip information and the predetermined data.

Therefore, label information can be generated or selected when a business application as the automatic label generation target is in operation.

Further, the label management system 102 correlates and stores in the label information DB 142*b* the label information generated or selected at the time of input of the data of the slip information with (i) the slip number of the slip information and (ii) the application ID of the business application in operation at the time of input of the slip information.

Therefore, label information can be correlated with slip information in input and a business application in operation at the time of generation or selection of the label information.

Further, in the associated application DB 142*a*, the label identification information is correlated and stored with the application ID of a business application associated with the content of the label information identified with the label identification information, and when a business application is started, the label management system 102 refers to the label information DB 142*b* and preferentially displays on the display unit 12 (*i*) a label based on the label information correlated with the application ID of the started business application or (ii) a label based on the label information having the label identification information correlated and stored with the application ID of the started business application in the associated application DB 142*a*.

Therefore, labels correlated with a business application in operation or labels associated with the business application in operation can be preferentially displayed to attract a user's attention.

Further, the label management system 102 displays on the display unit 12 the detailed content of a label specified through the operation unit 11 among the label(s) displayed on the display unit 12. Therefore, a user can easily check the detailed content of a label.

Further, comments on a main label are input as the label information of an associated label, the main label being the displayed label based on the label information having the label identification information correlated and stored with the application ID of the started business application in the associated application DB 142*a*. Therefore, a user can input a reply to the main label.

Further, the label management system 102 displays the main label and the associated label to be switchable according to user operation. Therefore, a user can check both the main label and the associated label with simple operation.

Further, when the slip call button 1221a on the label detail check screen 1221 is pressed, the label management system 102 makes the business system 101 read the slip information relevant to the displayed label information from the business system DB 141a and display the read slip information on the display unit 12. Therefore, a user can easily check the slip information in input at the time of generation or selection of the label.

The above embodiment is a preferred example of the data input device 1 of the present invention, and hence the present invention is not limited thereto.

For example, in the above embodiment, the data input device 1 inputs data of slip information. However, the present invention is not limited thereto and is applicable to data input devices which input other data.

Further, in the above embodiment, the business system DB 141a, the automatic label generation pattern DB 141b, the associated application DB 142a and the label information DB 142b are stored in the storage unit 14 which is in the data input device 1, but may be stored in an external database server or the like.

Further, in the above embodiment, in the display control process, the labels generated or selected while the started business application is or was in operation and the logged-in user is or was using the device (the labels based on the label information satisfying the conditions at each of Steps S23 and S24 in FIG. 10) are preferentially displayed. Alternatively, no matter who currently logs in, the labels generated or selected while the started business application is or was in operation, namely, the labels correlated and stored with the application ID of the started business application in the label information DB 142b, may be preferentially displayed.

Further, the labels associated with the started business application (the labels based on the label information satisfying the condition at Step S27 in FIG. 10) may be preferentially displayed.

The detailed configuration and action of the data input device 1 can also be appropriately modified without departing from the spirit of the present invention.

In the above, an embodiment of the present invention is explained. However, the scope of the present invention is not limited to the above embodiment but includes the scope of claims below and the scope of their equivalences.

What is claimed is:

1. A data input device, comprising:
    a determination unit which determines whether a predetermined automatic label generation condition is satisfied on the basis of (i) input data and (ii) predetermined data that has a type relevant to the input data and is stored in an automatic label generation condition storage unit;
    a generation/selection unit which generates or selects electronic label information having a predetermined content correlated and stored with the automatic label generation condition when the determination unit determines that the automatic label generation condition is satisfied;
    a storage control unit which correlates and stores the generated or selected electronic label information with input-data identification information of the input data in a label information storage unit;
    an automatic label generation pattern storage unit where the automatic label generation condition is correlated and stored with (i) the electronic label information generated or selected when the automatic label generation condition is satisfied, (ii) label identification information to identify a type of the electronic label information, and (iii) application identification information of an application as a target in which the electronic label information is generated; and
    a plurality of applications to input and display different types of date, wherein
    when the application identification information of an application in operation at time of input of the input data is stored in the automatic label generation pattern storage unit, the determination unit determines whether the automatic label generation condition correlated and stored with the application identification information of the application in operation is satisfied on the basis of the input data and the predetermined data.

2. The data input device according to claim 1, wherein the storage control unit correlates and stores in the label information storage unit the generated or selected electronic label information with (i) the input-data identification information of the input data and (ii) the application identification information of the application in operation at the time of input of the input data.

3. The data input device according to claim 1, wherein the input data is data of slip information.

4. The data input device according to claim 1, wherein the determination unit determines whether the predetermined automatic label generation condition is satisfied on the basis of (i) the input data and (ii) the predetermined data stored in the automatic label generation condition storage unit which is internally or externally provided.

5. The data input device according to claim 1, wherein the storage control unit stores the input data in an input data storage unit which is internally or externally provided, and correlates and stores the generated or selected electronic label information with the input-data identification information in the label information storage unit which is internally or externally provided.

6. The data input device according to claim 2, further comprising:
    a display unit;
    an associated application storage unit where the label identification information is correlated and stored with the application identification information of an application associated with the content of the electronic label information identified with the label identification information; and
    a display control unit which, when an application is started, refers to the label information storage unit and preferentially displays on the display unit (i) a label based on the electronic label information correlated with the application identification information of the started application or (ii) a label based on the electronic label information having the label identification information correlated and stored with the application identification information of the started application in the associated application storage unit.

7. The data input device according to claim 6, further comprising an operation unit, wherein
    the display control unit displays on the display unit a detailed content of a label specified through the operation unit among the label displayed on the display unit.

8. The data input device according to claim 6, further comprising an input unit through which a comment on a main label is input as the electronic label information of an associated label, the main label being the displayed label based on the electronic label information having the label identification information correlated and stored with the application identification information of the started application in the associated application storage unit, wherein the storage control unit associates and stores the electronic label information of the associated label with the electronic label information of the main label in the label information storage unit.

9. The data input device according to claim 8, wherein the display control unit displays the main label and the associated label to be switchable according to user operation.

10. The data input device according to claim 6, further comprising a commanding unit through which the input data relevant to the label displayed on the display unit is commanded to be displayed, wherein when the input data relevant to the label displayed on the display unit is commanded to be displayed through the commanding unit, the display control unit makes the input data relevant to the electronic label information of the label displayed on the display unit be read from an input data storage unit and makes the read input data be displayed on the display unit.

11. A data input method, comprising:

starting, among a plurality of applications to input and display different types of data, an application to be in operation;

determining whether a predetermined automatic label generation condition is satisfied on the basis of (i) input data and (ii) predetermined data that has a type relevant to the input data and is stored in an automatic label generation condition storage unit;

generating or selecting electronic label information having a predetermined content correlated and stored with the automatic label generation condition when determining that the automatic label generation condition is satisfied; and correlating and storing the generated or selected electronic label information with input-data identification information of the input data in a label information storage unit, wherein when application identification information of the application in operation at time of input of the input data is stored in an automatic label generation pattern storage unit where the automatic label generation condition is correlated and stored with (i) the electronic label information generated or selected when the automatic label generation condition is satisfied, (ii) label identification information to identify a type of the electronic label information, and (iii) the application identification information of an application as a target in which the electronic label information is generated, in the determining step, whether the automatic label generation condition correlated and stored with the application identification information of the application in operation is satisfied is determined on the basis of the input data and the predetermined data.

12. A non-transitory computer readable storage medium having a program including a plurality of applications to input and display different types of data stored therein to make a computer of a data input device:

determine whether a predetermined automatic label generation condition is satisfied on the basis of (i) input data and (ii) predetermined data that has a type relevant to the input data and is stored in an automatic label generation condition storage unit;

generate or select electronic label information having a predetermined content correlated and stored with the automatic label generation condition when determining that the automatic label generation condition is satisfied; and correlate and store the generated or selected electronic label information with input-data identification information of the input data in a label information storage unit, wherein when application identification information of an application in operation at time of input of the input data is stored in an automatic label generation pattern storage unit where the automatic label generation pattern storage unit where the automatic label generation condition is correlated and stored with (i) the electronic label information generated or selected when the automatic label generation condition is satisfied, (ii) label identification information to identify a type of the electronic label information, and (iii) the application identification information of an application as a target in which the electronic label information is generated, in the determination, whether the automatic label generation condition correlated and stored with the application identification information of the application in operation is satisfied is determined on the basis of the input data and the predetermined data.

* * * * *